L. A. CASGRAIN.
PEGGING MACHINE.
APPLICATION FILED SEPT. 26, 1899.
924,965.
Patented June 15, 1909.
7 SHEETS—SHEET 1.
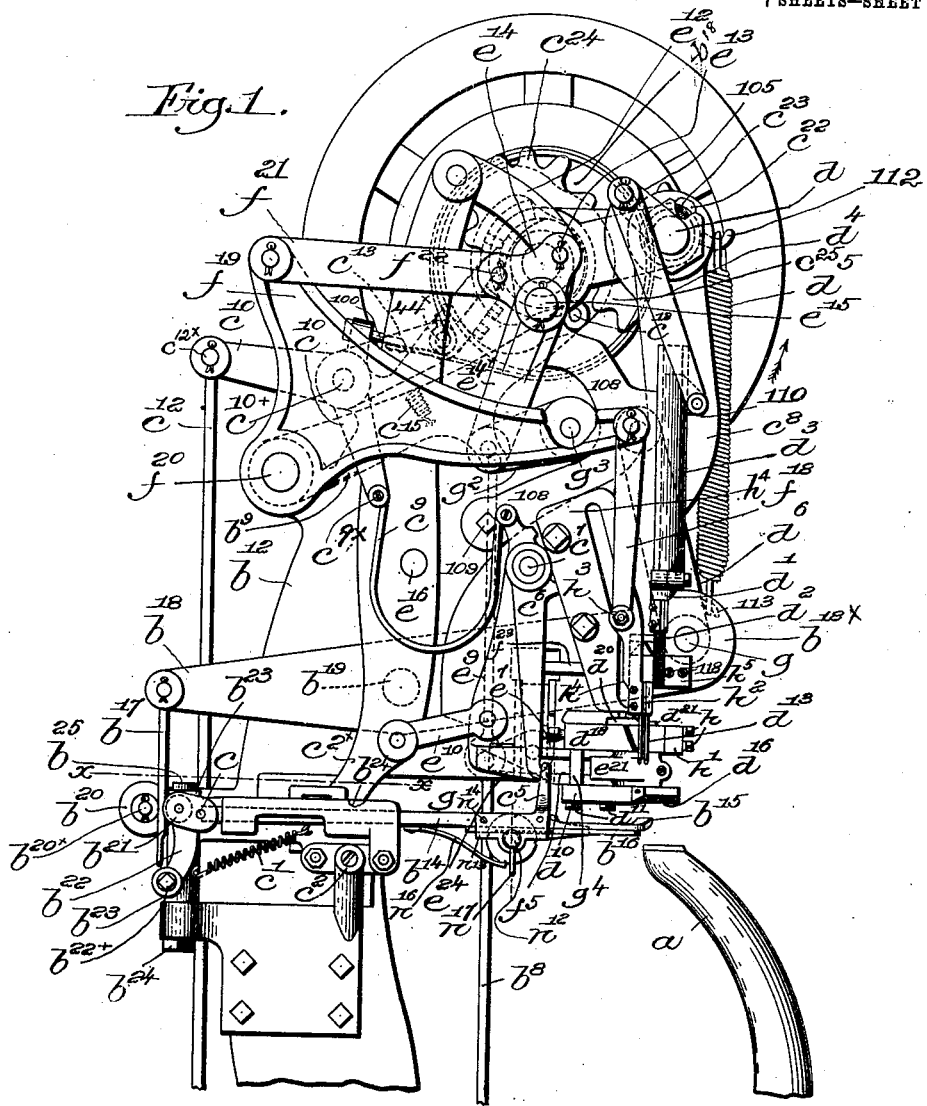
Fig. 1.
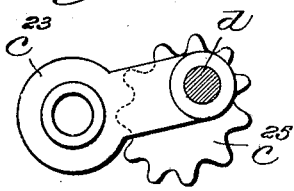
Fig. 2<sup>a</sup>.
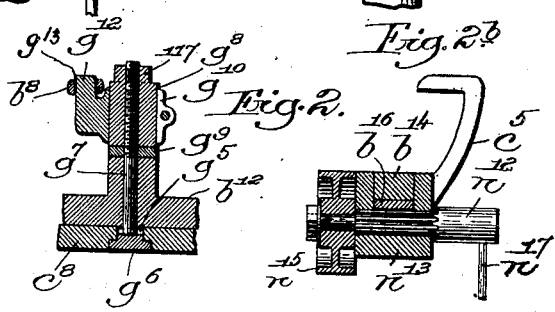
Fig. 2. Fig. 2<sup>b</sup>.
Witnesses:
Thomas J. Drummond
Gustav F. Magnitzky
Inventor:
Louis A. Casgrain,
by Crosby & Gregory
Attys.

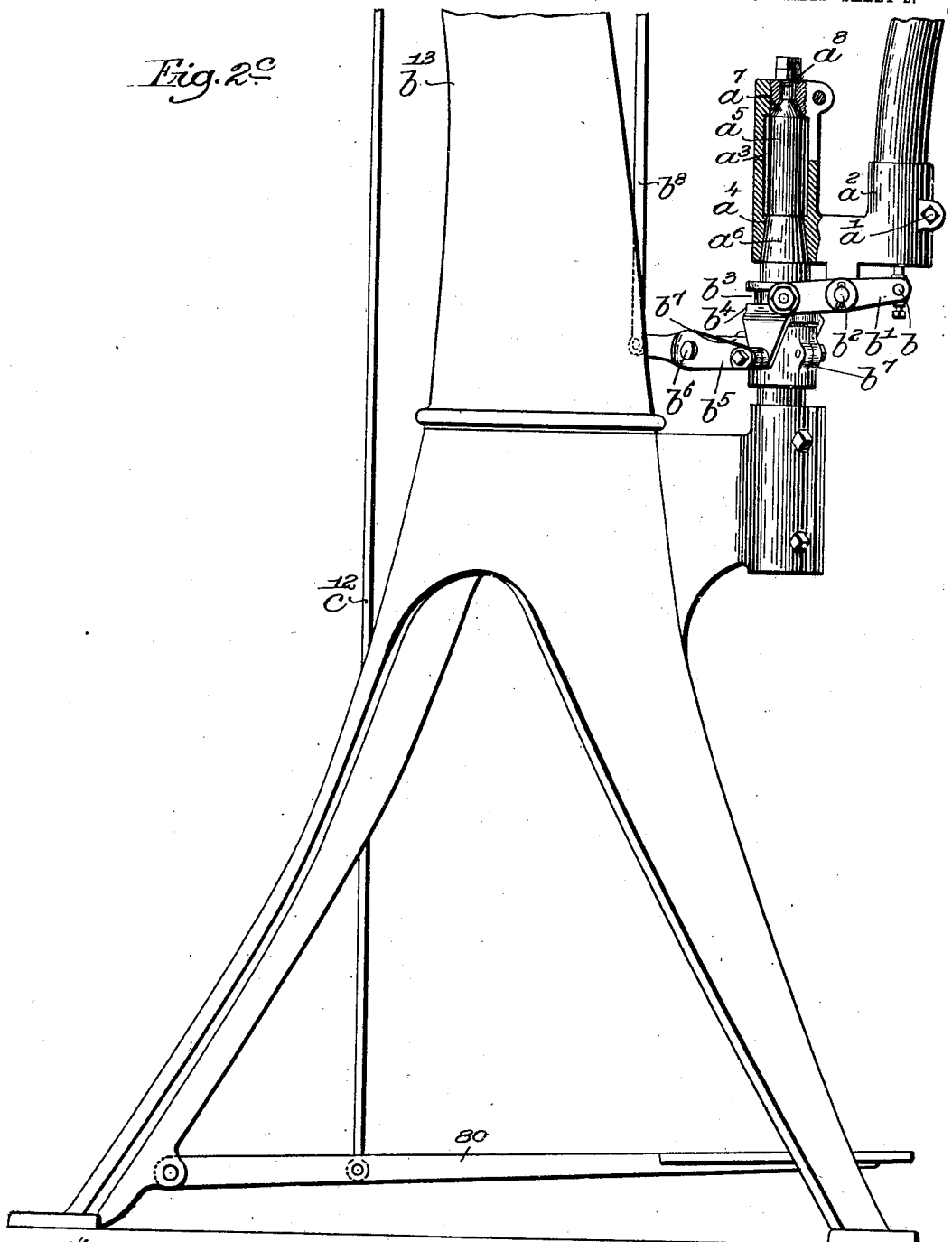

L. A. CASGRAIN.
PEGGING MACHINE.
APPLICATION FILED SEPT. 26, 1899.
924,965.
Patented June 15, 1909.
7 SHEETS—SHEET 3.
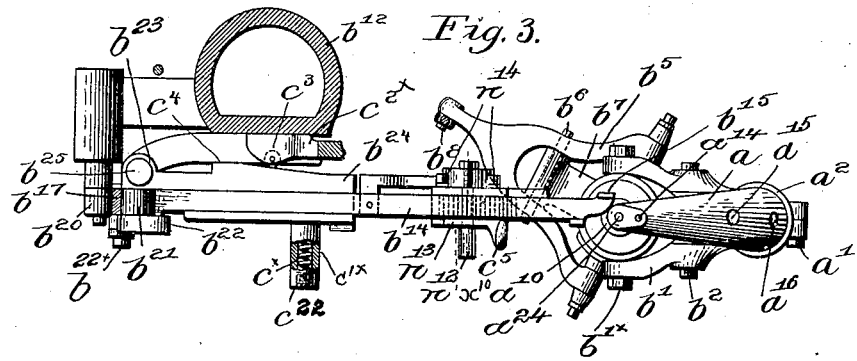
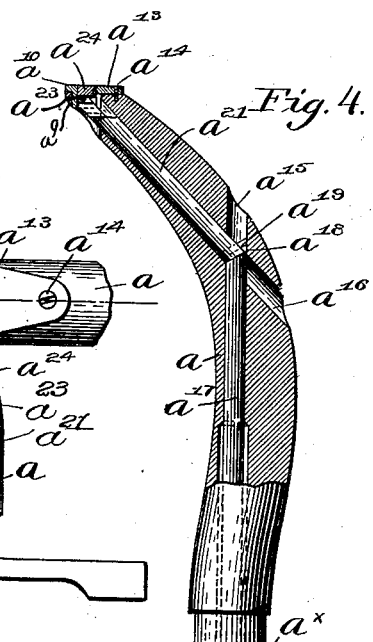
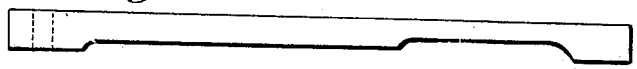
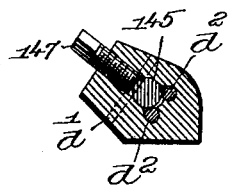
Witnesses:
Thomas J. Drummond
Gustav F. Magnuzky
Inventor
Louis A. Casgrain,
by Crosby & Gregory
Attys.

L. A. CASGRAIN.
PEGGING MACHINE.
APPLICATION FILED SEPT. 26, 1899.
924,965.
Patented June 15, 1909.
7 SHEETS—SHEET 4.
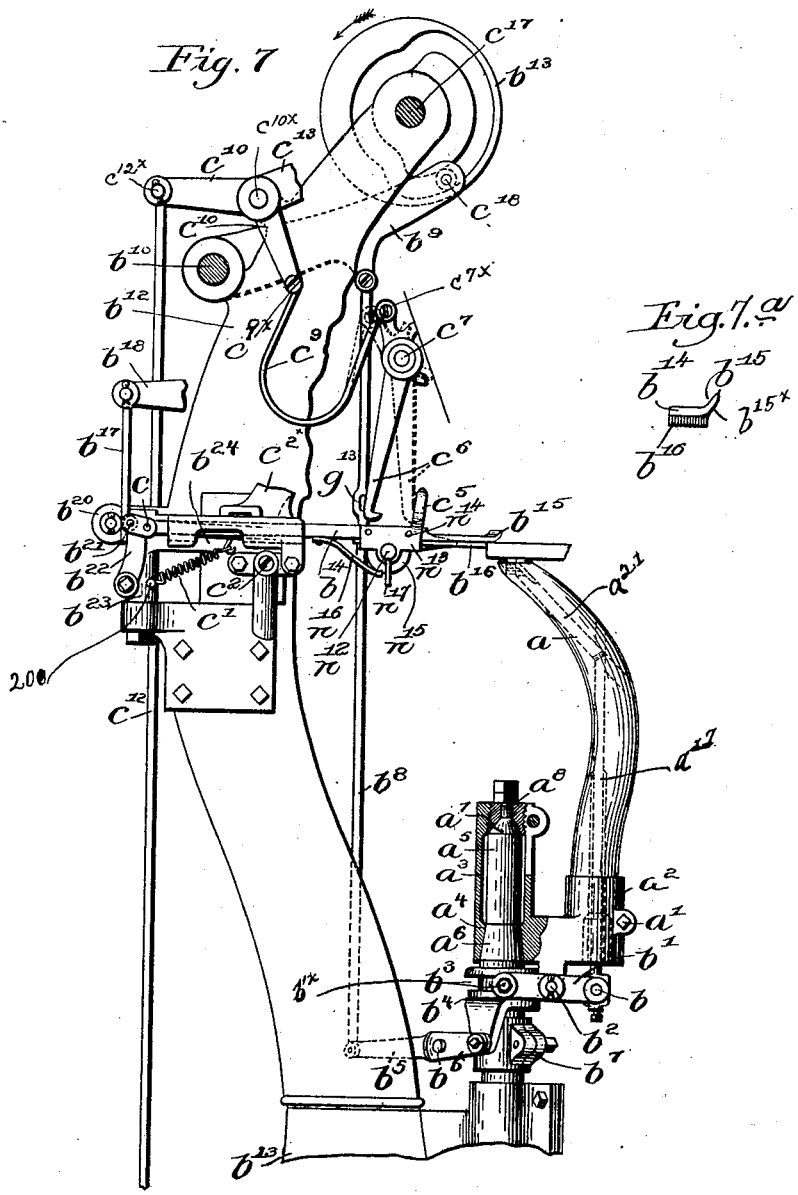

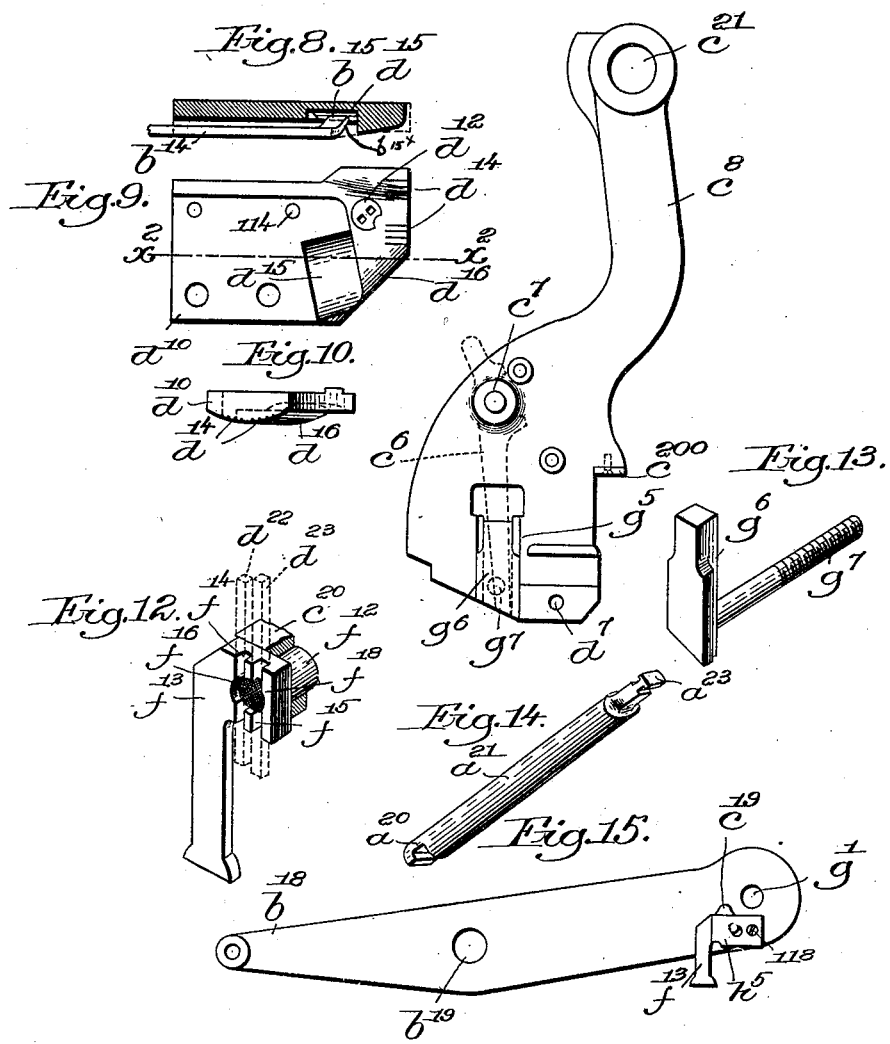

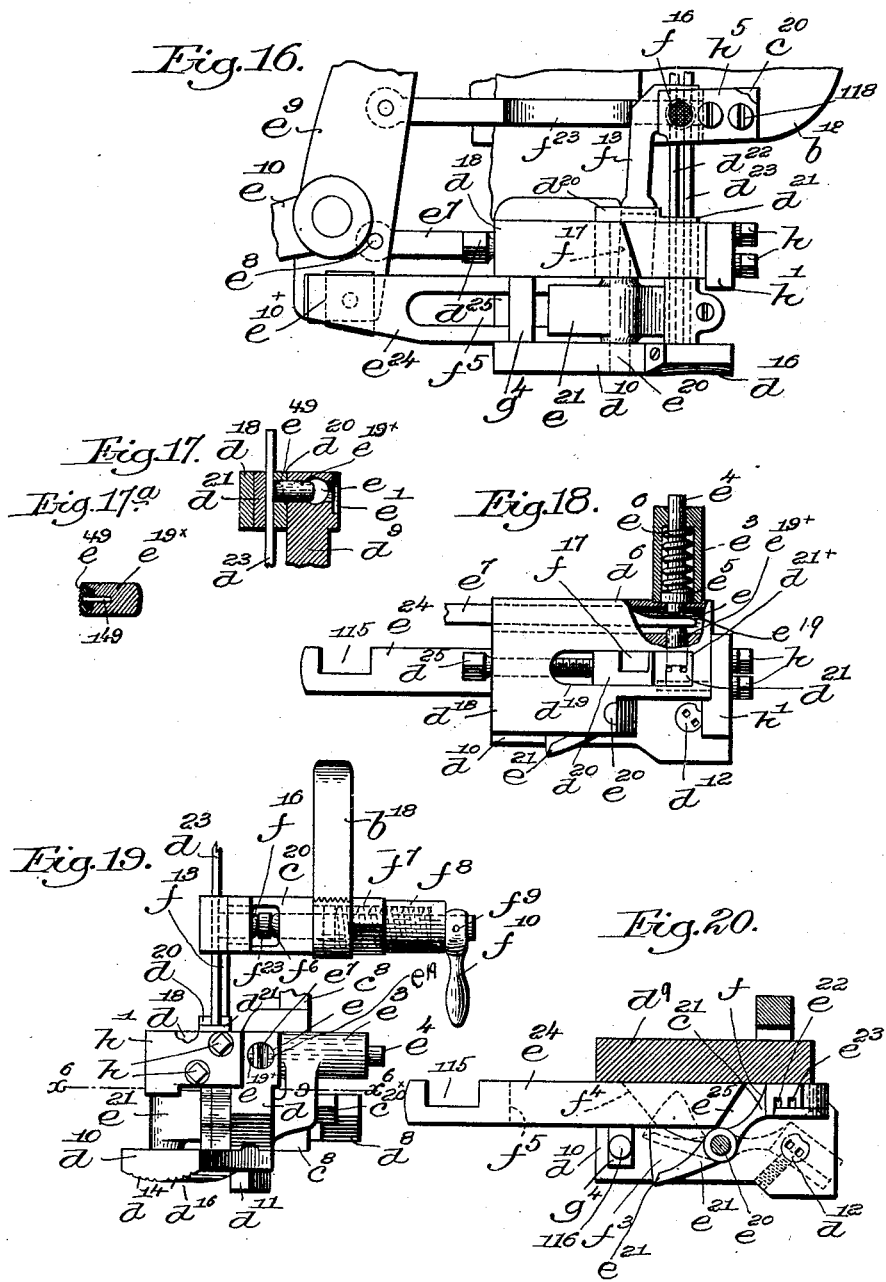

L. A. CASGRAIN.
PEGGING MACHINE.
APPLICATION FILED SEPT. 26, 1899.
924,965.
Patented June 15, 1909.
7 SHEETS—SHEET 7.
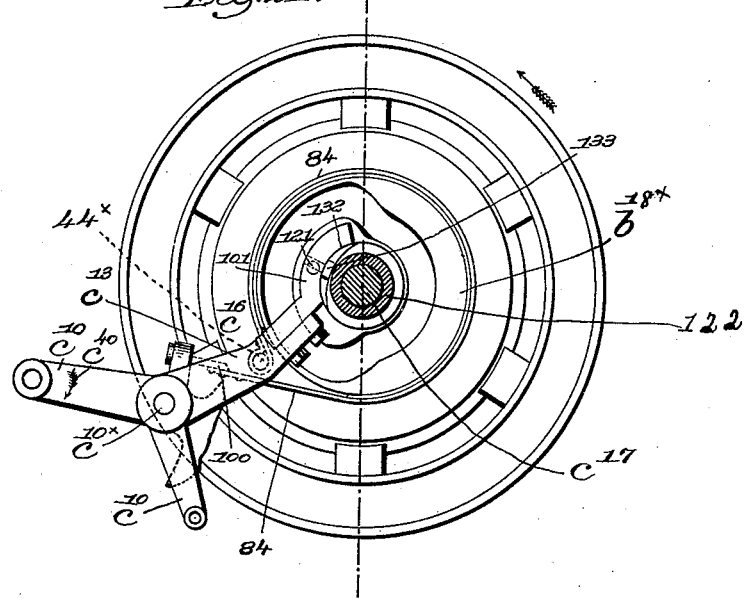
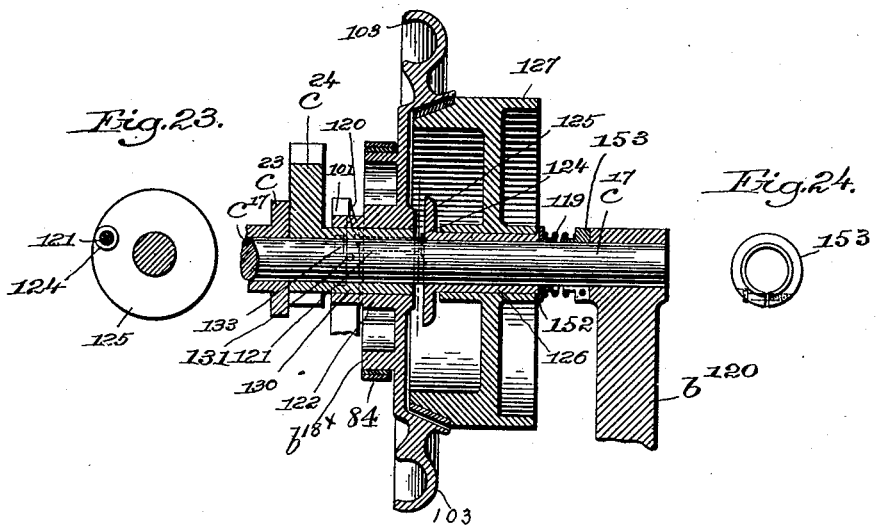
Witnesses:
Fred S. Greenleaf.
Thomas J. Drummond.
Inventor:
Louis A. Casgrain,
by Crosby & Gregory
Attys.

UNITED STATES PATENT OFFICE.

LOUIS A. CASGRAIN, OF WINCHESTER, MASSACHUSETTS, ASSIGNOR, BY MESNE ASSIGNMENTS, TO UNITED SHOE MACHINERY COMPANY, A CORPORATION OF NEW JERSEY.

PEGGING-MACHINE.

No. 924,965.          Specification of Letters Patent.          Patented June 15, 1909.

Application filed September 26, 1899. Serial No. 731,698.

*To all whom it may concern:*

Be it known that I, LOUIS A. CASGRAIN, a citizen of the United States, and residing at Winchester, county of Middlesex, and State of Massachusetts, have invented an Improvement in Pegging-Machines, of which the following description, in connection with the accompanying drawings, is a specification, like letters on the drawings representing like parts.

In pegging machines employing a rotary horn to support the shoe sole while being pegged, the tip of the horn has been provided with a hole into which may enter the point of the awl as it passes through the inner sole, the hole obviating breaking the point of the awl, and in the operation of such machines the points of the pegs driven into the awl holes protrude more or less into the said hole in the horn and are cut off either by a cutter in the horn, or by other means after the shoe has been removed from the horn.

In the pegging machine to be herein described, the length of each peg driven into the sole is determined automatically according to the thickness of the stock at the point where the peg is driven, and consequently the point of the peg does not protrude through the inner sole to the extent that it does in the old way, but the point is left just at the inner surface of or just through the inner sole.

With the pegging machine to be herein described, I employ a horn having a hole in its top, and said hole has fitted into it a plunger which may be moved at times to leave the hole open for the entrance of the awl point, the plunger at other times being put into position with its end flush with the top of the horn, at which time it acts against the inner surface of the inner sole at or about the line of pegging to push back that portion of the inner sole which was made to protrude somewhat by the passage through it of the awl. In addition to pushing back the bulge part of the inner sole, this plunger preferably performs also another very important function, *i. e.*, it hits the points of the pegs which are usually driven as stated to protrude for a short distance through the inner sole, and by pressure and percussion clenches or brooms the end of each peg at the face of the inner sole, thereby adding to the holding power of the peg in the stock.

In the illustrated preferred embodiment of the invention a substantially endless peg ribbon is cut crosswise or transversely in making each peg to be driven, and the pegs are left with substantially square or blunt ends to appear at the inner surface of the sole or stock lying on the horn, while the outer or head ends of the pegs lie flush with the upper surface of the stock. Moreover in the preferred embodiment of the invention it is intended for the most of the time to employ two peg ribbons and to drive simultaneously two pegs at one operation into two holes made in the stock side by side by two awls, and consequently the hole in the top of the horn is larger than usual, and there is a greater tendency for a portion of the inner sole in the line of pegging to protrude and leave an objectionable ridge which requires to be leveled to present a proper smooth inner sole next the foot.

The invention is herein shown as applied to a machine of the type represented in U. S. Letters Patent No. 447,358, dated March 3, 1891, but it will be understood that the invention may be embodied to advantage in other forms of pegging machines.

The endless peg ribbons employed have each a cross section equal to the diameter of the peg to be driven, and to control the formation of pegs from the peg ribbons, I have provided, above the usual foot-plate which rests upon the outer face of the outer sole and which rises and falls according to variations in thickness of the sole, a combined peg cutter and carrier which is provided with passages to receive the ends of the peg ribbons, the latter being fed into said passages for a greater or less distance according to the thickness of the sole then immediately under the foot plate and between it and the horn, the thicker the sole the greater being the distance that the ends of the peg ribbons are inserted into said passages.

The cutter and carrier is moved laterally, cutting off the peg ribbons, and stops with the pegs immediately over peg passages in a bushing properly secured in the foot plate and in line with the drivers, so that as the drivers descend they will meet the pegs in the passages of the cutter and carrier and drive them therefrom through the bushing into the sole supported on the horn.

The bushing is of considerable thickness and the passages therein are of such diameter with relation to the pegs being driven that the pegs are guided until their heads are fully driven flush with the outer face of the outer sole, and so guided, the pegs are prevented from splitting.

The drivers descend through the passages in the bushing for a distance sufficient to drive the pegs and leave their heads flush with the outer face of the outer sole.

The machine has a shoe feeding device, shown as a lever having backward and forward movement to engage and retire from the edge of the sole, and a lateral movement while a toothed block of the lever is in contact with the edge of the sole, to thereby feed the shoe over the horn, but herein I have provided the acting or front end of this feeding device with a lip which rides at all times on the outer surface of the outer sole and rises and falls with the varying thickness of the sole, so that the roughened or toothed block or contact surface carried by the shoe feeding device to engage the edge of the sole, always engages said edge at a defined uniform distance from the outer face of the outer sole whatever the thickness of the stock on which said lip rests during each feeding stroke. This lip at the end of the feeding lever or device provides an effective substitute for a presser foot, which has heretofore been used in the patented machine referred to, the lip performing all the functions of said presser foot and greatly simplifying the machine, and further, said lip by riding on the surface of the sole causes the toothed block or contact surface carried by the feed device to move in unison with and absolutely prevent the contact surface from over-riding the sole or from descending far enough to engage or mar the upper. This lip presents a convexed face so that it may readily ride up the end of a tap or half sole applied to the outer sole.

The shoe feeding device is further provided with a projection which is engaged by a suitable lifter shown as a hook or catch regulated as to its position through a treadle under the control of the foot of the operator, preferably the usual starting and stopping treadle.

When the machine is running regularly and the operator has his foot upon the treadle, the hook is disengaged from the projection of the shoe feeding device so that the lip thereof rests upon the face of the outer sole, but whenever the operator removes his foot from the treadle to stop the machine, the lifter is immediately turned into a position to engage the projection of the shoe feeding device as the foot plate is being raised into its normal elevated position preparatory to stopping the machine, said lifter causing the shoe feeding device to rise as the foot-plate is lifted by its actuating means, so that the free end of the shoe feeding device is removed sufficiently from the top of the horn and is there retained in an abnormally high position to permit free passage of the upper of a boot or shoe between the horn on one side and the shoe feeding device and foot-plate on the other side without any interference.

The putting of the foot on the treadle to start the machine immediately disengages the hook, letting the lip of the shoe feeding device descend upon the surface of the outer sole.

I have supported the lever constituting the shoe feeding device in a novel vibrating box.

The nose plate is provided at its under side with a recess at a distance back from its front end, in which the acting end of the shoe feeding device may move when returning to its starting position, even though the foot plate bears upon the outer face of the outer sole.

The underside of the foot plate is convexed in the direction of the movement of the shoe sole under it, and also concaved transversely thereto, a foot plate of such shape enabling it to ride up or down the end of a tap or half sole laid on the main sole, and also enabling the foot plate to somewhat round the outer face of the sole near its edge.

By rounding the face of the sole during the pegging operation, I am enabled to do away with rounding or leveling the sole on a special machine after the usual peg driving operation. And I find in practice better results from driving the pegs into the rounded or level surface of the sole as the said sole is rounded step by step as compared with first driving the pegs throughout the entire sole and subsequently rounding and leveling the sole, as I find that by the latter process the sole resumes more or less its shape before the rounding, whereas if the pegs are driven into the surface being rounded step by step, the pegs act to hold the sole in the position in which it is put by pressure previous to driving the peg.

I have herein and will hereafter frequently use the term "peg". The machine herein described is adapted to use a peg made as an endless ribbon, but it will be obvious that parts of the machine might be used to equally good advantage in a machine using the well known peg strip, or using metal wire.

The shaft for operating the drivers sustains the lifting lever to which is attached the foot plate resting on the outer sole, and said foot plate in earlier machines is liable to yield as the drivers in their descent act to drive pegs in the stock, and the pegs are not driven properly, so to obviate this I have provided means for locking the foot plate in its depressed position to keep the stock clamped firmly while the drivers act to drive the pegs into the stock on the horn. I have also provided means whereby the lever employed for feeding the peg ribbons may feed said ribbons uniformly at each operation.

Figure 1, in side elevation, represents the main working parts of a pegging machine embodying my invention, together with part of a horn or work support shown fully and in detail in other figures; Fig. 2, is an enlarged sectional detail of the lower end of the foot-plate lifting-lever, and its clamping means; Fig. 2$^a$ shows part of the lever $c^{23}$, and the driver actuating shaft with its eccentric gear thereon; Fig. 2$^b$ is a section in the line $x^{10}$, Fig. 3; Fig. 2$^c$ shows the lower part of the machine omitted from Fig. 1, this figure together with Fig. 1 making a full side view of the machine; Fig. 3 is a section below the dotted line $x$, Fig. 1; Fig. 4 shows a broken out detail of the horn and parts carried within it; Fig. 4$^a$, is a detail of the upper end of the slide rod $a^{17}$; Fig. 5 is a top view of the horn; Fig. 6, is a section on the line $x'$; see Fig. 5. Fig. 6$^a$ is a sectional detail showing the awl bar and its two awls clamped therein. Fig. 7 is a detail showing the horn and its plunger and operating devices for the same, and the shoe feeding lever and means for operating it; Fig. 7$^a$, is a detail looking at the front end of the feeding lever; Fig. 8 is a longitudinal section of the foot plate in the dotted line $x^2$, Fig. 9; Fig. 9 is an underside view of said foot plate, and Fig. 10 is a front end view; Fig. 11 shows the foot-plate lifting lever detached, and its clamping device, the dotted lines showing the feed-lever lifting devie or hook applied in working position thereon; Fig. 12 shows the peg feeding guideway for the peg ribbons and part of its actuating lever; Fig. 13 is a detail showing the clamp for holding the foot plate lifting lever; Fig. 14 shows the uppermost plunger-actuating slide-rod removed from the horn; Fig. 15 shows the so-called main lever detached, the parts shown in Fig. 12 on a larger scale being in position on said lever; Fig. 16 shows much enlarged the foot-plate and parts carried by it, parts for feeding the peg ribbons, and the combined cutter and carrier; Fig. 17 is a sectional detail through the pieces forming the guide for the peg ribbon just above the combined cutter and carrier, this figure showing also the peg ribbon clamping gripper, its carrying stud or seat and part of a piece of peg ribbon; Fig. 17$^a$ is a detail showing one of the grippers detached. Fig. 18, is a top or plan view of some of the parts shown in Fig. 16, with the sleeve and part of the plate $d^6$ broken out; Fig. 19, is a view of the parts shown in Fig. 16, from the right of an observer of said figure; Fig. 20 is a partial section in the dotted line $x^6$, Fig. 19, looking down; Fig. 21 is a section of the main shaft at the inner side of the cam to show the brake and fast and loose members of the friction driving pulleys; Fig. 22 is a section on the line $x^7$, Fig. 21; Fig. 23 is a detail of the collar and its sliding pin; Fig. 24 is a detail showing the collar 153. Fig. 25 is a detail showing the upper edge of the slide-bar $f^{23}$ detached.

The horn $a$ has a shank $a^\times$ Fig. 4, which is clamped by a screw $a'$ Fig. 7 in a recess made at one end $a^2$ of a hub $a^3$, having a conical bearing $a^4$ surrounding a fixed stud $a^5$, having a conical surface $a^6$, the end $a^7$ of the stud being shown as of cone shape to enter a conical hole in a plug $a^8$, screwed into the top of the hub $a^3$. The upper end of the horn is bored through to leave a passage, see Figs. 4, 5 and 6, for the reception of the tubular shank $a^9$ of the horn tip $a^{10}$ Figs. 5 and 6, it having a hole $a^{12}$ and an ear $a^{13}$ which is entered by a screw $a^{14}$, by which to confine the tip to the horn. The horn has also a longitudinal vertical bore $a^{15}$, which is intersected by a diagonal bore $a^{16}$. The vertical bore $a^{15}$ receives a main slide-rod $a^{17}$ provided at its upper end with a diagonal groove $a^{18}$, see Figs. 4 and 4$^a$, leaving a diagonal projection $a^{19}$ to enter a diagonal groove $a^{20}$ in the lower end of a second or auxiliary slide rod $a^{21}$, shown detached in Fig. 14, having its upper end reduced and grooved at opposite sides see Figs. 6 and 14, leaving a T-shaped end $a^{23}$ to enter a correspondingly shaped groove, see Fig. 6, at the underside of the plunger $a^{24}$, fitted in the hole left at the top of the horn in the tip $a^{10}$. The position of this plunger is controlled by the rods referred to, so that the hole in the top of the horn or its tip may be opened for the reception of the points of the usual awls as they pass through the inner sole supported on the top of the horn, as in Fig. 7, or said plunger may be moved to occupy a position flush with the face of the tip, see Fig. 4, immediately after the pegs have been driven into the awl holes of the sole.

The sole is clamped between the horn and the foot-plate $d^{10}$, to be described, as the drivers act to drive the pegs, and the pegs having been driven the plunger is raised into the position shown in Figs. 4 and 6, and acts to clench or broom the points of the pegs, the plunger at the same time forcing back the portions of the inner sole or stock which were made to enter the hole $a^{12}$ in the tip by the passage of the awls through the stock and the driving of the peg points through said holes, the upward movement of the plunger leaving the inner sole substantially smooth and with the peg points broomed. To draw this plunger into the horn preparatory to the action of the awls, the rod $a^{17}$ will be depressed, and to put the plunger with its face flush with the face of the top of the horn the rod $a^{17}$ will be lifted.

To control the movement of the rod $a^{17}$ up and down at the proper times to actuate the plunger $a^{24}$, I have connected the lower end of said rod by a pin $b$ to one end of a lever $b'$, pivoted at $b^2$ on a depending ear of the hub $a^3$, the opposite end of said lever, see Figs. 3 and 7, being shown as bifurcated and provided with roller or other studs $b'^{\times}$ which enter the annular groove $b^3$ in a sliding collar $b^4$ mounted loosely on the stud $a^5$. This collar has a depending lug, see Fig. 7, to which is jointed a lever $b^5$, pivoted on a stud $b^6$, carried by a collar $b^7$, see Figs. 3 and 7, clamped on the stud $a^5$. The opposite end of the lever $b^5$ is jointed to a link $b^8$ in turn jointed to a lever $b^9$, mounted on a stud $b^{10}$, extended from the upper frame work $b^{12}$ of the machine, said frame work being mounted on a suitable column $b^6$ which stands on the floor, said column sustaining the stud $a^5$, constituting the center of motion of the horn. The lever $b^9$ is raised and lowered at the proper times during each operation of the machine, to thus move the plunger, by a cam $b^{13}$, the plunger, see Fig. 7, being retracted or drawn into the hole in the top of the horn, as the awls descend and pass through the stock, the awls entering the hole in the horn and the plunger being lifted while the driver is in contact with the peg to close the hole flush with the top of the horn, clench or broom the peg points, and batter back and smooth the inner sole.

The horn has to be rotated during the process of putting the sole in proper position with relation to the peg driving means in order that the sole may receive the pegs in the proper place and line, and to enable this to be done in the herein shown construction the hub of the horn is free to be rotated about the stud $a^5$, the roller studs of the lever $b'$ traveling about with the horn in the groove of the sliding collar $b^4$, mounted on said stud, so that said collar whenever moved will actuate the rod $a^{17}$ whatever may be the position occupied by the horn.

The shoe feeding device comprises essentially a bar $b^{14}$ provided at its under side back of its free end with a toothed block $b^{16}$, hereinafter designated as a contact surface, that, as the bar is moved, both longitudinally and about a center as a lever in a manner hereinafter to be described, engages the sole edge intermittingly and feeds the shoe over the horn.

The bar $b^{14}$ is shown sustained in a groove at the upper side of a grooved box $b^{24}$ and the face of the toothed block that engages the sole edge occupies always a position more or less distant from the free or outer end of said bar so that the outer end of the bar forms, see Figs. 7 and 7$^a$, what is hereinafter designated as a lip $b^{15}$ that rides at all times on the sole throughout the operation of driving fastenings to secure a sole to a shoe. This lip overhangs the face of said toothed block and occupies a position directly thereover in a vertical plane included between the side walls of the bar rather than at one side thereof, so that said lip rests on the face of the sole directly above that part of the edge of the sole that is engaged by said toothed block when feeding the sole.

The lip $b^{15}$, preferably convexed at its under side as shown at $b^{15\times}$, takes the place of the usual presser-foot and as the shoe is moved continuously over the horn in the act of securing the sole to the shoe, rides up the end of a tap or half sole and also rides off the end of said tap or half sole while the contact surface continues to engage the sole and feed the shoe over the horn.

The toothed block may be adjusted longitudinally of the bar to vary the distance that the lip may project beyond the acting face of said block according to the distance it is desired to drive pegs or fastenings from the edge of the sole, and the lip is always of a length sufficient to enable it to bear constantly on the top of the sole while the bar is moved longitudinally as will be described, that the toothed block carried thereby may engage and feed and then retire from its engagement with the sole edge preparatory to again engaging the sole to feed the shoe another step.

To provide for adjusting the toothed block on the under side of said bar and longitudinally thereof, the under side of the block has a series of teeth that are engaged by a toothed rod $n^{12}$, see Fig. 2$^b$, having its bearings in a box or frame $n^{13}$ secured to said bar by pins $n^{14}$. The toothed rod $n^{12}$ is provided at one end outside said box with a hand piece $n^{17}$ and at its other end with a distance regulator $n^{15}$ having a series of transverse notches located at desired distances apart, each notch designating a predetermined distance for a series of fastenings from the edge of the sole, either of which notches may be engaged by a locking device $n^{16}$ shown as a spring, and consequently when the regulator is turned through the hand piece either notch may be engaged by the locking device to insure the position desired for the acting face of the toothed block from the end of the bar $b^{14}$ to provide for the insertion of the fastenings for any number of pairs of boots or shoes at exactly the same distance from the edge of the sole.

The bar $b^{14}$ derives its longitudinal movement to enable the toothed block $b^{16}$ to engage the sole edge by means of a cam leg $b^{17}$ jointed to one end of the main actuating lever $b^{18}$ of the machine, said lever having extended therefrom near its center a stud $b^{17}$, see Fig. 1 which enters a hole or bearing in the frame part $b^{12}$.

The cam leg $b^{17}$ acts between a roller $b^{20}$ mounted on a fixed stud $b^{20\times}$ and a roller $b^{21}$ carried by an arm $b^{22}$ connected by bolt $b^{22\times}$ with the hub $b^{23}$ of the vibrating box $b^{24}$ mounted on an upright stud $b^{25}$ and constituting part of the feeding device, said box having a groove at its upper side, see Fig. 3, in which is laid loosely the bar $b^{24}$ said bar being free to be slid in a groove of said box as the bar is moved to engage the edge of a sole to feed the same and when retiring therefrom preparatory to a second feeding stroke. The arm $b^{22}$ has a stud $c$ which enters a cross notch at the rear end of the bar $b^{14}$, the contact of said stud with the end of the bar being maintained by a spring $c'$ connected at one end with a hook at the under side of said bar, see Figs. 1 and 7, and at its opposite end with a fixed stud 200 extended from the hub $b^{23}$. When the cam leg is depressed to occupy the position Fig. 1, the bar $b^{14}$ is moved longitudinally, thus causing the edge of the toothed block to engage the sole edge preparatory to feeding the shoe over the horn, the stock at this time being unclamped, said toothed block being withdrawn from contact with the sole edge by the spring $c'$ when the stock is unclamped.

After the toothed block carried by the bar $b^{14}$ engages the sole edge, said bar will be moved laterally by the lever $c^{2\times}$ mounted on a stud $e^{16}$ of the main frame $b^{12}$, the upper end of said lever being connected with a link $e^{12}$ jointed at $e^{13}$ to a lever $e^{14}$ mounted on a crank pin $e^{15}$ extended from the end of the main shaft. The lever $c^{2\times}$ is provided at its lower end with a roller $c^3$, see Fig. 3, which acts against an inclined portion $c^4$ of the pivoted box $b^{24}$ moving said box about its pivot $b^{25}$, the box taking with it the bar $b^{14}$ causing the toothed block then in engagement with the sole edge to be moved laterally to feed the shoe over the horn, and then the bar $b^{14}$ having been retracted to remove the toothed block from contact with the sole edge, the pivoted box $b^{24}$ is turned backwardly, about its pivot $b^{25}$ into its normal or starting position by or through the action of a suitable spring $c^{\times}$ in a sleeve $c'^{\times}$ fixed on the main frame, said spring being adjustable by a screw $c^{22}$.

Herein I have provided means to effect the lifting of the feeding device automatically whenever the machine is stopped, and for this purpose the box or frame $n^{13}$ is provided with a projection $c^5$ which may be engaged by a feed lifter $c^6$ to be herein described, said feed lifter being shown as a hook normally out of engagement with said projection, and pivoted on a stud extended from one side of a foot-plate lifting lever $c^8$ shown separately in Fig. 11 and in position in Fig. 1.

Prior to my invention, a feeding device presenting at its front end a lip adapted at all times to ride on the outer face of the sole and having a toothed block occupying a position in the vertical plane of said bar behind the end of said lip has not had combined with it means for positively lifting the feed-device from the stock and holding it lifted while the machine was at rest in order that ample clearance may be left between the feeding device and the top of the horn for the removal and application thereto of a shoe.

The feed lifter $c^6$ has at its upper end a stud $c^{7\times}$ Fig. 7 which is engaged by a yielding connection $c^9$ attached at its opposite end to a stud $c^{9\times}$ of a three armed lever $c^{10}$, pivoted at $c^{10\times}$, said lever having jointed to it by a screw stud $c^{12\times}$ a rod $c^{12}$ which in practice may be joined to any suitable treadle 80, see Fig. $2^c$, at the base of the column $b^{13}$ near the floor, and said treadle will preferably be the one used to start and stop the machine. The third arm $c^{13}$ of the three armed lever $c^{10}$ is shown partially in Fig. 7 and fully in Fig. 21, and by dotted lines in Fig. 1. By moving the lever $c^{10}$ in the direction of the arrow $c^{40}$, Fig. 21, the machine may be started, and by moving in a direction opposite said arrow the machine may be stopped.

The machine will be stopped whenever the operator removes his foot from the treadle referred to, and at such time a spring $c^{15}$, see Fig. 1, connected with the lever $c^{10}$ moves it in a direction in opposition to the foot of the operator to enable the lever to separate the clutch pulley and stop the machine, as will now be described.

The arm $c^{13}$ of the lever $c^{10}$ is inclined for a part of its length upwardly, and thereafter it is curved, as at 101 Fig. 21, the face of said curved part next the hub of the pulley 103 being inclined or beveled at 120, see Fig. 22, so that whenever the end of said lever is drawn toward the shaft $c^{17}$, by the spring $c^{15}$, see Fig. 1, it will be met by a pin 121, shown in Figs. 21 and 22 by dotted lines, and in Fig. 23 in section. This pin 121 has at its inner end a head 124, see Figs. 22 and 23, and it slides in a hole in the sleeve 122 of the hub $b^{18\times}$ of the pulley 103, and when the pin meets the inclined side of the arm $c^{13}$, said pin is slid longitudinally in said sleeve, causing the head of the pin to act against the flange 125 of a sleeve or bushing 126, surrounding the shaft $c^{17}$ loosely and forming a bearing about which the loose pulley 127 turns, pushing said bearing and pulley to the right, see Fig. 22, against the stress of a spring 119, surrounding said shaft at the end of said bushing, said spring embracing at one end the flange of a collar 152 surrounding the shaft loosely, the opposite end of said spring butting against a collar 153 fast to the shaft $c^{17}$, such movement of the running pulley 127 unclutching the same from the fast pulley 103 preparatory to stopping the machine.

The sleeve 122 of the hub $b^{18\times}$ of the fast pulley 103 is forced or made to embrace snugly the sleeve hub 130 of the large eccentric gear $c^{24}$, common to said patent, it in practice engaging a smaller eccentric gear $c^{25}$, shown fully in Fig. $2^a$ and partially in Fig. 1.

Fig. 22 shows the gear $c^{24}$ in section, its hub and the hub of the fast pulley being pinned at 131 to the main shaft $c^{17}$.

The sleeve 122 is provided, see Fig. 21, with a depression 132 in which may enter a stud 133, carried by the arm $c^{13}$, said depression receiving said stud only when the main shaft and its cams occupy the position in which it is desired that said cam shall stop when the machine is stopped, a brake to be described operating at such time to positively stop the rotation of said shaft and at a definite point. The arm $c^{13}$ of the lever $c^{10}$ has pivoted upon it at $44^\times$ one end of a suitable flexible or strap brake 84, the opposite end of which is connected with a hook or device 100, carried by and adjustable on said lever. The ends of the brake are attached to the lever arm $c^{13}$ at different distances from its fulcrum, so that as the lever $c^{10}$ is moved after the stud 133 enters the depression 132 of the sleeve 122 of the hub of the fast pulley, the strap brake 84 is made to embrace or fit said hub $b^{13}$ closely, the friction of said hub on said strap-brake drawing the latter tighter and tighter on said hub until the fast pulley is stopped, the latter always stopping at a definite point.

The clutch mechanism above described is not herein claimed, as it has been made the subject matter of a divisional application, Serial No. 48,393, filed February 23, 1901.

When the machine is running regularly and the operator has his foot on the treadle 80, the spring $c^9$ operates to keep the feed lifter or hook $c^6$ in its inoperative position, shown by full lines in Fig. 7, but when the operator desires to stop the machine, he has only to remove his foot from the treadle when the spring $c^{15}$ starts the lever $c^{10}$ and causes the yielding connection $c^9$ to turn the feed lifter forward into the full line position Fig. 1 and dotted line position Fig. 7, so that as the main lever $b^{18}$ meets the shoulder $c^{200}$ of the foot-plate lifting lever $c^8$, see Fig. 11, and lifts said lever, it causes said feed lifter $c^6$ then in engagement with the projection $c^5$ of the feeding lever $b^{14}$ to lift the latter lever as in Fig. 1, removing the lip $b^{15}$ from the stock. The lever $c^8$ has a hole $c^{21}$ at its upper end which embraces loosely a suitable annular projection $c^{22}$ of a hollow hub at one end of a lever $c^{23}$, the opposite end of said lever surrounding loosely the main shaft, said shaft being provided next said arm with an eccentric gear $c^{24}$, see Fig. 1, which in practice engages another similar eccentric gear $c^{25}$, fast on a shaft $d$ having its bearings in a hole made in the end of the lever $c^{23}$, said shaft in its rotation through a suitable crank 105 connected therewith at one end, and a link $d^4$, reciprocating the driver bar $d'$, it having as herein shown attached to it two drivers $d^2$, said bar being free to be slid in a slotted case $d^3$ fixed to the head $b^{12}$ by suitable bolts or screws 109, one only shown, inserted through the arms 108 extended from the case. The driver bar is shown as having an ear 110 extended through a slot of the case, said ear being jointed to the link $d^4$.

As the foot lifting lever $c^8$ is raised as described, it lifts the free end of the lever $c^{23}$, and with it the shaft $d$ which acts to give to the driver bar its movement to cause the drivers to meet the pegs and drive them into the sole. The strong spring $d^5$ connected at its upper end with a stud 112 of the lever $c^{23}$, and at its lower end with a projection 113 of a link $d^6$ to be described which is actuated to move the lever $b^{18}$, enables the said link and the end of the lever $b^{18}$ with which it is connected to continue their descent after the foot plate meets and is arrested by a thick part of the sole or stock resting between it and the horn. This is necessary because the link $d^6$ and the lever $b^{18}$ have a constant throw.

The lever $c^8$ has at its lower end a hole $d^7$ see Fig. 11 which receives a bolt $d^8$, see Fig. 19, which enters a threaded hole in one side of a plate $d^9$, forming a sort of box, said plate being herein shown as grooved at its under edge, see Fig. 19, to receive a rib extended from the foot-plate $d^{10}$, the rib preventing any twisting movement of the foot-plate with relation to the lever $c^8$, said foot-plate being confined to the plate $d^9$, by a bolt $d^{11}$. The foot-plate has a hole to receive a bushing $d^{12}$, having as shown two passages through which the awls $d^{13}$ may descend when entering the sole lying on the horn and held clamped between the foot-plate and horn. These holes also serve as passages for the pegs as they are driven from the peg cutter and carrier to be described into the sole, said passages acting to guide the pegs substantially throughout the entire driving operation and preventing the pegs from being split, the ends of the drivers descending into said holes in the act of driving the pegs, said drivers driving the heads of the pegs flush with the outer face of the sole.

It has in the past been customary to take pegged shoes to a leveling machine and by a separate operation level the sole, but herein I have so constructed and operated the foot-plate that the sole may be leveled as it is being pegged.

The foot-plate has its front end convexed transversely in the direction of the movement of the sole under it, see Figs. 10 and 19, and said convexed part is shown as corrugated at $d^{14}$, to prevent the slipping of the sole under the foot-plate when going up or down the end of a tap, and the underside of said foot-plate, see Figs. 1 and 8, is also somewhat concaved in the direction of the length of the foot-plate, see Figs. 8 and 16, thereby making a surface which, aided by the heavy blows of the head of the machine as it descends at each operation of the machine, rounds or molds the face of the sole.

The underside of the foot-plate is cut away, see Fig. 9, to afford a space $d^{15}$ which the lip $b^{15}$ at the end of the feeding lever $b^{14}$ may enter between the feeding movements of the lever when the foot-plate is lowered, so that its part $d^{16}$ rests on the sole.

The plate $d^9$ of the box has an overhanging top $d^{18}$, see Figs. 16 and 18, which is provided with a longitudinal slot $d^{19}$, see Fig. 18, in which is secured a peg ribbon guide composed as shown of two blocks or pieces of steel $d^{20}$, $d^{21}$, said pieces being of considerable length in order to afford an ample guide. The passages in these blocks for the guidance of the peg ribbons $d^{22}$ and $d^{23}$ have to be of substantially the diameter and shape of the peg ribbons, and great difficulty was experienced in making two passages at suitable distances apart to guide the peg ribbons. This difficulty was solved by employing two pieces $d^{20}$, $d^{21}$, and by a milling machine the piece $d^{21}$ was provided with two parallel grooves for the peg ribbons $d^{22}$ and $d^{23}$, and said piece $d^{21}$ had extended from it a projection $d^{21\times}$. The piece $d^{20}$ is notched or cut away to receive the grooved body of the part $d^{21}$, the lip $d^{21\times}$ meeting the end of the piece $d^{20}$, the putting together of said two blocks as shown, resulting in the part $d^{20}$ covering the grooves made in the part $d^{21}$, leaving two passages with four surrounding walls. Both these pieces properly fitted together are put into the slot $d^{19}$ and are clamped in place therein by a suitable set screw $d^{25}$.

The plate $d^9$ has a longitudinal bore $e$, shown in Figs. 18 and 19, and said bore is intersected by a bore $e'$, see Fig. 17. The plate $d^9$ has attached to it by suitable screws $c^{20\times}$ a sleeve $e^3$ having a chamber, see Fig. 19, in line with the bore $e'$, said chamber containing a plunger or device $e^4$, having at one end a collar $e^5$, said collar being kept pressed against the face of the plate $d^9$ at the end of the sleeve, by a spring $e^6$ surrounding the plunger. The plunger has at its inner end beyond the said collar a projecting portion $e^{19}$ which may be acted upon by the cam or wedge shaped end of an actuating bar $e^7$, extended through the bore $e$, said bar being jointed at $e^8$, see Fig. 16, to a lever $e^9$, pivoted on the stud $c^7$, carried by the lever $c^8$, said lever being connected by a link $e^{10}$ to the lever $c^{2\times}$ before described, for imparting lateral movement to the feeding lever.

The block $d^{20}$ has a hole, see Fig. 17, which is entered by the peg wood clamp or clamping gripper $e^{40}$ serrated at its edge to engage the peg-ribbon, and made semi-spherical at its back to enter a cavity or seat at the end of the stud $e^{19\times}$, which occupies a position in line with the plunger $e^4$, and is acted upon by the wedge shaped end of the slide bar $e^7$. The semispherical back of the clamp enables it to tip so that the toothed face of the clamp may adapt itself to any inequalities in the size of the peg wood grasped by it.

When the plunger $e^4$ is in the position Fig. 18, the collar $e^5$ thereon rests against the plate $d^9$, and the plunger cannot be moved farther toward the end of the clamp $e^{19}$, and when the clamp moving bar $e^7$ is in the position shown in said figure, in which position it does not contact with the inner end of the plunger, none of the force of the spring $e^6$ is put on said bar and consequently upon the clamp $e^{19}$, and said clamp under such condition does not in any way act to hold the peg ribbon against longitudinal motion through the passages in the blocks $d^{20}$ and $d^{21}$, but when the bar $e^7$ is moved to the right from its position Fig. 18, its wedge shaped end enters between the end of the plunger $e^4$ and the end of the clamp $e^{19}$, and the plunger $e^4$ is forced back against the action of its spring, and the force of the spring is transmitted through the bar $e^7$ against the outer end of the clamp $e^{19}$ and the face of said clamp is made to clamp the peg ribbon firmly.

The flange $d^{18}$ has depending from it, see Figs. 18 and 20, a stud $e^{20}$, on which is pivoted a combined peg cutter and carrier $e^{21}$, said stud entering also a hole in the foot plate to aid in confining it in a fixed position with relation to the foot plate.

The peg cutter and carrier is shown as a lever $e^{21}$ having at its front end two passages or throats $e^{22}$ and $e^{23}$, which at times occupy a position in line with the two passages for the peg ribbons in the blocks or pieces $d^{20}$ and $d^{21}$, as shown by full lines in Figs. 19 and 20. At other times said cutter and carrier is moved into its dotted line position Fig. 20, the passages $e^{22}$ and $e^{23}$ at such times being put in position directly over the passages in the bushing $d^{12}$.

To actuate the cutter and carrier I employ a slide bar $e^{24}$, the front end of which is beveled at $e^{25}$ to act against a shoulder $f$ of said cutter and carrier and swing the same aside from its full line position Fig. 20 into its dotted line position in the same figure, such movement of the cutter and carrier taking place while the ends of the peg ribbons stand in the passages $e^{22}$ and $e^{23}$ thereof, the distance that said peg ribbons stand in said passages varying however as the stock varies in thickness, so that the pegs are made to automatically vary in length according to the thickness of the sole to receive the pegs.

To insure the steady movement of the cutter and carrier in cutting off the pegs from the ribbon, and carrying them into driving position so that the passages $e^{22}$ and $e^{23}$ of the cutter and carrier may be located unerringly under and be held positively in such position that the pegs may be struck by the descending drivers $d^2$, the rear end of said cutter and carrier has been provided with a cam shaped wing or projection $f^3$ which rides on an inclined end $f^4$ of a slot $f^5$ made in said slide bar.

The slide bar derives its motion from its connection with the lower end of the lever $e^9$, said lever having attached to it a block $e^{10\times}$ which enters a side notch 115 in said bar.

The lever $b^{18}$ near one end has forming a part thereof a lug or projection $c^{20}$, see Figs. 16 and 19, provided with a hole in which is located the plunger $f^6$ surrounded by a spring $f^7$ shown by dotted lines in Fig. 19, said spring being arranged mostly in a sleeve $f^8$ screwed into the main lever $b^{18}$, the outer end of the plunger having pivoted upon it at $f^9$ a lever $f^{10}$, by turning which the plunger may be retracted or drawn out to the right when it is desired to put the feeding gripper $f^{16}$ to be described in its inoperative position to remove or apply peg ribbons to the machine.

The face of the lug $c^{20}$ is bored to receive a tubular shank $f^{12}$, see Fig. 12, of a compensating lever $f^{13}$, having two parallel grooves $f^{14}$, $f^{15}$, through which the peg ribbons pass on their way to the peg cutter and carrier. The tubular shank $f^{12}$ contains a peg feeding gripper $f^{16}$ having its face preferably notched to grasp firmly at times the sides of the peg ribbons, and by movement of the lever $b^{18}$ feed said ribbons downwardly so that their ends will enter more or less the passages in the cutter and carrier. The end of the lever $f^{13}$ enters a notch $f^{17}$ in the stationary piece $d^{20}$, and as the right hand end of the lever $b^{18}$ is lowered, the peg ribbons being then firmly gripped by the feeding gripper actuated as hereinafter described, said ribbons will be fed, and at the same time said compensating lever $f^{13}$ will be turned somewhat with relation to the end of the lever $b^{18}$, then descending in the arc of a circle, such turning movement compensating for the slight difference of movement of the two feed ribbons grasped in the two feed grooves $f^{14}$, $f^{15}$, which otherwise would occur, for without this movement the peg ribbon in the groove $f^{15}$ would get a little more movement or feed than the ribbon in the groove $f^{14}$.

When the feeding gripper is carried by a lever working in the arc of a circle this compensating for differences in extent of movement of the two feed ribbons is essential for successfully feeding the peg ribbons for equal distances.

The gripper $f^{16}$ is acted upon at its right hand end, viewing Fig. 19, by a wedge-shaped slide bar $f^{23}$ see Fig. 25 jointed to the lever $e^9$, hereinbefore described.

In operation, when the feeding gripper acts to grip the peg ribbons to feed them, the clamping gripper $e^{19}$ is released from its hold on the peg ribbons, and vice versa. The link $d^6$ before described as actuating the lever $b^{18}$ is joined at its lower end with a stud $g$ which enters the hole $g'$ in the lever $b^{18}$. The upper end of this link $d^6$ is jointed to a stud on the end of a lever $g^2$ pivoted on a stud $g^3$ of the main frame, the opposite end of said lever being jointed to a link $e^{14\times}$ mounted on a crank pin $e^{15}$ extended from the end of the main shaft and common to United States Patent No. 586,154. The overhanging lip $d^{18}$ is entered by the upper end 116 of a guide or flat edged stud $g^4$ against which one side of the bar $e^{24}$ slides. The peg ribbons $d^{22}$ and $d^{23}$ will be led from suitable reels, not shown, into the grooves $f^{14}$ and $f^{15}$, having coöperating with them the peg feeding gripper, and thence into the passages in the pieces $d^{20}$ and $d^{21}$.

The lever $c^8$ is slotted at its lower end as at $g^5$, see Fig. 11, and shoulders at each side of said slot receive a clamp $g^6$, shown as a block having extended from it at one side a screw threaded stud $g^7$, see Figs. 2 and 13. This stud is extended through a hole in the main frame $b^{12}$, and it then receives upon it a nut $g^8$ having a square outer end 117 which may be grasped by a wrench to adjust said nut on the threaded part of the stud, a washer $g^9$ being interposed between the nut and the main frame. This nut has clamped about it a split hub $g^{10}$, Fig. 2 having a projection $g^{12}$ which enters a suitable hole $g^{13}$ in the rod $b^8$, connected with the lever $b^5$.

The awls are carried by an awl bar $f^{18}$ jointed to a lever $f^{19}$, pivoted at $f^{20}$ and connected by a link $f^{21}$ to a stud $f^{22}$, of the lever $e^{14}$. When the points of the awls are about to penetrate the inner sole, at its inner side, the rod $b^8$ starts to descend and acting through the lever $b^5$ draws the plunger $a^{24}$ into the hole in the top of the horn, the speed of descent of the plunger and awls being substantially the same so that the points of the awls will not touch the plunger, yet the plunger may act to sustain most of the thrust of the awls when entering the sole. By the time that the awls reach the end of their down stroke the rod $b^8$ has turned the arm $g^{12}$ and nut $g^8$ far enough to draw the clamp $g^6$ into the slot $g^5$ and lock the lever $c^8$ firmly in place and hold it and its connected foot plate locked down while the driver bar and drivers descend to drive the pegs into the sole.

The locking of the lever $c^8$ carrying the foot plate, causes the latter to clamp the sole firmly and compress the same between the foot plate and the top of the horn while the awls rise and while the drivers deliver their blow, the locking of the said lever and foot plate down in position preventing any rising of the foot plate from the sole due to the blow of the drivers, the actuating shaft for moving the drivers turning in the foot plate lifting lever $c^8$.

Substantially as the drivers act to drive the points of the pegs through the sole, the plunger is lifted and forced against the interior of the inner sole about and in the line of the points of the pegs, said plunger clenching or brooming up said points and smoothing the inner sole in the line of the pegs by pushing back or smoothing that part of the leather which was made to protrude by the action of the awls and peg points, the lever $c^8$ being unlocked after or during this operation, to allow the head to rise so that the stock may be fed.

The plate $d^{18}$ has secured to it by suitable screws $h$, see Fig. 16, an abutment $h'$, the inner face of which occupies such a position as to receive against it a surface $h^2$ of the awl bar, said surface meeting said abutment just as the points of the awl approach the face of the outer sole and thereafter during the remainder of the stroke of the awls as they enter and retire from the sole said surface $h^2$ contacts with said abutment, the abutment preventing any side strain on the awls.

The awl bar has connected with it a roller or other stud $h^3$, which travels in a diagonal slot in a guide plate $h^4$, and consequently the awl bar and awls when descending travel in a diagonal path, and hence it is important to check instantly any momentum or tendency of the awl bar to travel diagonally, just as the points of the awls meet the face of the outer sole.

The open faces of the grooves $f^{14}$ and $f^{15}$ are covered by a plate $h^5$ attached to the projection $c^{20}$ by suitable screws 118, said plate keeping the lever $f^{13}$ in its working position.

Fig. 1 shows the parts of the machine in the position they will occupy when the machine is stopped. In said figure the stock feeding lever is shown forward and lifted, the plunger in the hole in the horn is supposed to be elevated as represented in Fig. 6, the right hand end of lever $b^{18}$ is supposed to be in its elevated position, and the feed gripper $f^{16}$ is closed on the peg ribbons, and the clamping gripper $e^{19}$ is supposed to be relaxed. Now the operator to start the machine puts his foot on the starting treadle moving the lever $c^{10}$, which enables the clutch mechanism, part of which is loose on the main shaft to become engaged, through the spring 119, see Fig. 22, and start the main shaft $c^{17}$, the lever $c^8$ carrying the foot-plate descending onto the stock resting on the horn, the descent of the foot-plate being arrested sooner or later according to variations in thickness of the stock resting on the horn. The foot-plate having come to rest upon the stock, the end of the lever $b^{18}$ carrying the feeding gripper, it being in engagement with the peg ribbons, continues to descend to feed the free ends of the said peg ribbon into the passages $e^{22}$, $e^{23}$, of the combined peg cutter and carrier $e^{21}$, the clamping gripper $e^{19}$ at such time being loose so as not to interfere at all with the downward movement of the peg ribbons into the passages of the peg cutter and carrier. The lever $b^{18}$ in its downward stroke, which is always for a defined distance, feeds the peg ribbons for a greater or less distance into the passages $e^{22}$, $e^{23}$, according to whether the foot-plate rests on parts of the sole of greater or less thickness, and as soon as the said lever $b^{18}$ completes its down stroke the clamping gripper $e^{19}$ acts to grasp the peg ribbon, just fed into the combined peg cutter and carrier, at a point just above the said cutter and carrier, and the feeding gripper $f^{16}$ is loosened. As the foot plate meets the sole, the awl bar descends and the awls pierce the sole, and the plunger in the horn descends in advance of the awls as stated, and the awls having operated, the lever $c^8$ is locked and the awls are elevated from the stock, and in this condition the slide bar $e^{24}$ is moved to turn the cutter and carrier aside, causing it to cut off the peg ribbons between the upper surface of the carrier and the lower ends of the pieces $d^{20}$, $d^{21}$, said cutter and carrier being moved aside far enough to put the passages containing the pegs directly over the passages in the bushing of the foot plate, and thereafter the drivers descend, meet said pegs, and drive them into the sole, the foot plate being kept locked down during such operation to clamp the stock firmly, and the plunger in the horn rises about as the drivers start to ascend from the passages in the bushing and clench or broom the ends of the pegs and push back the protruding parts of the inner sole, and this done the foot-plate rises and the cutter and carrier is swung back into position again to again receive the ends of the peg ribbons, the clamping gripper $e^{19}$ in the meantime holding on to the peg ribbon during the rise of the right hand end of the lever $b^{18}$, said lever carrying the feeding gripper yet disengaged from the peg ribbons, so that said gripper rides up over said ribbons to get into its normal or starting position, and thereafter the shoe is fed. The foot-plate rises always to the same position, a position sufficient to always remove the under side of the foot-plate from contact with the stock in order that the shoe may be fed over the horn. One awl and driver may be used if desired with a single peg ribbon. Instead of using one single feeding gripper, or one clamping gripper to engage a plurality of ribbons, I may use two separate gripper devices, or two separate clamping devices actuating them simultaneously. This operation of driving pegs may be continued as long as desired, but whenever the operator removes his foot from the treadle, the lifting device $c^6$ during that operation of the machine is put automatically into position to engage the projection $c^5$ of the feeding lever or device, so that as the foot-plate is next lifted the feeding lever will be lifted by it and held above the end of the horn in such position, see Fig. 1 as to enable the work to be removed from the horn or new work to be put on the horn, and as the foot plate is now in its elevated position the machine is automatically stopped by unclutching the friction pulleys and applying the brake.

U. S. Patent No. 447,358 previously referred to shows a lever substantially like the lever herein designated as the main lever, but that lever has imparted to it a variable throw to provide for varying lengths of clenching of the nail, the variations in length of stroke being controlled by an eccentric lever actuated by the foot lift bar. Herein the lever carrying the foot-plate does not in its movements affect the throw of the said main lever, and herein also for the first time the lever $c^8$ has combined with it locking means to keep it down on and compress the stock on the horn and also around the sole while the drivers act to drive pegs therein and preferably also while the awls rise from the stock. The drivers $d^2$ and the awls $d^{13}$ are each similarly held in their respective bars by locking devices, so I need herein especially describe only how the drivers are held.

Referring to Fig. 6$^a$, where the driver bar is shown in cross section, it will be understood that the lower end of the bar is bored longitudinally for the reception of a clamping pin 145, shown as cylindrical in cross section, and said bore is further provided with two smaller grooves preferably made by a boring tool, which intersects the bore containing the pin 145, and in these two smaller grooves are entered the shanks of the drivers $d^2$, the clamping pin contacting with both said shanks, the said pin being forced against said shanks by a suitable set screw 147, which engages the third hole of the bar. The feeding gripper $f^{16}$ is seated in a cavity in a stud as described of the clamping gripper $e^{19}$, and its stud $e^{19\times}$, and said gripper may in practice have a central hole, see Fig. 17$^a$, in which may enter loosely a pin or projection 149, extended from the part supporting it, said pin preventing the accidental escape of the gripper yet permitting it to adapt itself to the surface of the peg ribbons.

The clutch mechanism herein shown and described is not herein claimed, as it is described and claimed in application Serial No. 48,393, filed February 23, 1901, which has been divided from this application.

Having described my invention what I claim as new and desire to secure by Letters Patent, is:—

1. A pegging machine comprising an awl and awl bar, a driver and driver bar, and a horn provided at its top with a hole, combined with a plunger occupying at all times a position within said hole and fitting the hole snugly to thereby insure the guiding of said plunger by the horn, and means to retract said plunger in said hole in advance of a descent of the awl, and to raise said plunger after a peg has been driven into the hole made in the stock by the awl at its descent, the upward movement of the plunger brooming or clenching the point of the peg protruding through the stock and pushing back the portions of the stock forced into the hole in the horn by the awl and peg as the latter is being driven, said stock surrounding the point of the driven peg.

2. A pegging machine comprising an awl and awl bar, a driver and driver bar, and a horn provided at its top with a hole, a plunger fitted snugly to said hole and at all times occupying a position therein, and means to positively lower said plunger in a straight line in advance of the descent of the awl, said means also acting thereafter positively to raise said plunger after a peg has been driven in the hole in the stock made by the awl at its descent, the upward movement of the plunger brooming or clenching the point of the peg and pushing back portions of the stock forced into the hole in the horn by the action of the awl and peg.

3. In a machine of the class described, a feeding device presenting a bar provided with a contact surface for engaging the edge of the sole, the end of said bar overlying said contact surface in the same vertical plane, and extending beyond said surface, thus forming a lip to ride on the outer face of the sole directly over said contact surface, said lip insuring the engagement of said contact surface uniformly with the edge of the outer sole at the same distance from its face on which said lip bears whatever the thickness of the sole.

4. In a machine of the class described, a stock support, a stock feeding device presenting a toothed surface to contact with the edge of the stock sustained by said support, said feeding device having a lip convexed at its under side and located immediately above said toothed surface in the same vertical plane, said lip bearing on the upper side of the stock opposite the point thereof engaged by said toothed surface, said lip by reason of its shape being free to ride upwardly on a tap sole, and means to actuate said feeding device that its toothed surface may engage the stock intermittingly.

5. In a pegging machine, a feeding device presenting a bar having a connected toothed surface to engage the sole edge, the end of said bar being extended beyond said toothed surface to form a lip directly thereabove in the same vertical plane, and means to move said bar both longitudinally and laterally that said toothed surface may engage the sole edge intermittingly and move the sole over the stock support sustaining the same, said lip bearing continuously on the outer face of the outer sole and said toothed surface engaging the edge of said sole throughout the operation of feeding the sole.

6. In a machine of the class described, a feeding device having an engaging surface adapted to engage intermittingly the edge of a sole to feed the same, said feeding device having a lip directly above and extended beyond said engaging surface, said lip being convexed at its under side to bear continuously on the outer face of the sole when said engaging surface is disengaged from the edge of the sole between one and the next feeding operation.

7. In a machine of the class described, means for inserting fastenings in stock, a stock feeding device having a roughened contact surface to engage the edge of the stock, said device being provided at its end with a lip located directly above and extended beyond said roughened surface, said lip being shaped to ride on the face of the stock when said surface is out of contact with the edge of the stock, and means to impart both longitudinal and lateral movement to said feeding device that it may engage the stock intermittingly and move the same, said lip remaining in contact with and sliding over the face of the stock throughout the entire operation of the stock feeding device, thus insuring the action of the engaging surface against the stock at a uniform distance from the upper edge thereof.

8. In a pegging machine, a feeding device having a contact surface to engage the stock, and at its forward end a lip to overlap and bear upon the face of the stock, a pivoted lever having a cam face in which said feeding device is free to slide, a cam leg to move said feeding device in said pivoted lever to cause said contact surface to engage the stock, and means acting upon said pivoted lever to turn it about its pivot to thereby cause the feeding lever in engagement with the stock to feed the stock over the horn.

9. In a pegging machine, a horn, a pivoted box having a groove, a bar applied loosely in said groove, said bar having at its under side an attached toothed block to engage the edge of the sole of a shoe sustained on said horn, the end of said bar overlapping and being extended beyond the acting face of said toothed block, combined with a cam leg to slide said bar in said pivoted box to cause the toothed block to engage the sole edge, and means to turn said box and bar laterally about the pivot of the box while the toothed block is in engagement with the sole edge, thus moving the sole over the horn.

10. In a machine of the class described, a stock feeding device, and means actuated automatically only when the machine is stopped to lift and retain said feeding device in its inoperative position above the stock to enable the stock to be changed.

11. In a machine of the class described, a stock support, a feeding device, a lifting device normally disengaged from said feeding device when the machine is in operation, and means to actuate said device to lift said feeding device from the stock only when the machine is stopped to thereby provide for ready removal and application of stock from and to the stock support.

12. In a pegging machine, a horn, a feeding device having a contact surface to engage the stock and having a lip projecting beyond said contact surface to bear on the upper surface of the stock, and means normally inoperative under the control of the operator to lift said feeding device away from the work to allow the work to be removed from or applied to the horn.

13. In a machine of the class described, a stock support, a feeding device having a lip to bear on the stock during the operation of the machine, a lifting device and means under the control of the operator to cause the lifting device to engage and disengage the feeding device when it is desired to start or stop the feeding of the stock over the stock-support.

14. In a machine of the class described, a stock support, a feeding device to engage and feed the stock, a foot plate to bear on the stock, means carrying said foot plate, means to lift said foot plate during the regular operations of the machine, a lifting device moving in unison with said foot plate, means under the control of the operator to normally keep said lifting device in its inoperative position, and means to put said lifting device automatically in its operative position to engage and lift the feeding device with the foot plate when the machine stops.

15. In a machine of the class described, a lever carrying a foot plate, a feeding device, a lifting device pivoted on the foot plate carrying lever, means to lift said foot plate lever, and a starting and stopping treadle, the release of said treadle by the operator putting said lifting device in position to engage and lift the feeding device with it.

16. In a machine of the class described, a stock support, a vertically movable foot plate, and a device carrying it, a locking device, and actuating means operating intermittingly to lock the foot plate in position on the stock to clamp the same on the stock support.

17. In a machine of the class described, a stock support, a foot plate to bear on the stock, a device carrying the said foot plate, means to lift the foot plate from the stock, a device to cause said foot plate to descend and adapt itself to varying thicknesses of stock, a locking device and actuating means therefor to lock said foot plate temporarily in its position to clamp the stock between the foot plate and stock support.

18. In a machine of the class described, a stock support, a lever carrying a foot plate, a driver bar having a driver, a driver bar actuating shaft rotatable in a hole in said lever, and a locking device to hold said lever and its foot plate in position to clamp the stock between itself and said stock support while the driver is operated to drive a peg into the clamped stock.

19. In a machine of the class described, a stock support having a movable peg clenching plunger, a lever carrying a foot-plate, a driver bar having a driver, a driver bar actuating shaft rotatable in a hole in said lever, and a locking device to hold said lever and the foot-plate in position to clamp the stock between the foot plate and said stock support while the driver is operated to drive a peg into the clamped stock, and means to move said plunger while the driver is down and the stock is clamped to clench the end of a driven peg.

20. In a machine of the class described, a stock support having a movable peg clenching plunger, a lever carrying a foot-plate, an awl bar having an awl, a driver bar having a driver, a driver bar actuating shaft rotatable in a hole in said lever, and a locking device to hold said lever and the foot-plate in position to clamp the stock between itself and said stock support while the awl bar is lifted to withdraw the awl and the driver is operated to drive a peg into the clamped stock, and means to move said plunger while the driver is down and the stock is clamped to clench the end of a driven peg.

21. In a machine of the class described, a stock support, a lever carrying a foot-plate, means to lift said foot-plate from the stock, means to cause said foot-plate to descend for a variable distance to meet the upper side of the stock whatever its thickness, a sliding clamp coöperating with a slotted part of the foot-plate carrying lever, and means to move said clamp to temporarily lock the said lever in its down position.

22. In a machine of the class described, a rotatable driver bar operating shaft, a lever hung on said shaft and provided with a foot-plate, a main lever, means to actuate the same uniformly at each stroke to lift the foot-plate, its carrying lever and the driver shaft to enable the foot-plate to release the stock, and a spring to cause said lever and foot-plate to descend and meet the stock of varying thickness.

23. In a machine of the class described, a stock support, a lever carrying a foot-plate, means to lift said foot-plate from the stock, means to cause said foot-plate to descend for a variable distance to meet the upper side of the stock whatever its thickness, a clamp coöperating with the foot-plate carrying lever, and means to move said clamp to temporarily lock the said lever in its down position.

24. In a machine of the class described, a stock support having a vertically movable peg clenching plunger, a lever carrying a foot-plate, means to lift said foot-plate from the stock in order that it may be fed over the stock support, means to cause said foot plate to descend on the stock varying in thickness, a locking device for the lever carrying said foot plate, a lever, means to actuate it, a rod connected with said lever, and connections between said rod and the plunger in the horn to move the latter, and devices also actuated by said rod to operate said locking device.

25. In a machine of the class described, a lever carrying a foot-plate, a feeding device, a lifting device pivoted on the foot-plate carrying lever, means to lift said foot-plate, and a starting and stopping treadle mechanism connected with the lifting device, the release of said treadle mechanism by the operator putting the said lifting device in position to engage and lift the feeding device with it.

26. In a pegging machine, a foot plate convexed on its lower side in the direction of the feeding movement of the sole, and concaved in the direction of its length, whereby said foot plate acts to round or level the sole, substantially as described.

27. In a pegging machine, a foot-plate having a recess at its underside and convexed externally at its end beyond said recess, and a feed lever having at its front end an extended lip to bear on the sole, said lip entering at times said recess, substantially as described.

28. In a pegging machine, a main lever, a peg ribbon gripper adapted to grip and feed a plurality of ribbons, a compensating lever carried by said main lever, and a device to govern the position of said compensating lever and the ribbon gripper relatively to said main lever, in order that the peg ribbons may be fed for the same distances.

29. In a machine of the class described, a foot plate self-adapting to the thickness of the stock, a combined peg carrier and cutter mounted thereon, a lever, a peg ribbon feeding gripper carried thereby, and means for operating said lever always for the same distance.

30. In a machine of the class described, the foot-plate lifting lever, a peg ribbon feeding gripper, a peg ribbon holding gripper, a gripper actuating lever pivoted on said foot plate lifting lever, devices carried by said gripper actuating lever to move the grippers, and an independent lever connected by a link with said gripper actuating lever.

31. In a machine of the class described, the foot plate lifting lever, a peg ribbon feeding gripper, a peg ribbon holding gripper, a gripper actuating lever pivoted on said foot plate lifting lever, devices carried by said gripper actuating lever to move the peg ribbon feeding and holding grippers, an independent lever connected by a link with said gripper actuating lever, a combined peg carrier and cutter and an actuating device therefor connected with said gripper actuating lever.

32. In a machine of the class described, a stock support, a foot-plate and its carrying lever, means to lift said lever to a uniform starting point and means to cause it to descend for a variable distance depending on the thickness of the stock, a combined peg cutter and carrier moving up and down in unison with said foot-plate, and having holes to receive the ribbons, means to feed for a uniform distance a plurality of peg ribbons simultaneously into the holes of the peg cutter and carrier, means to operate said cutter and carrier to form pegs and put them in driving position, a plurality of drivers to drive said pegs, and means to lock said foot plate in position to clamp and hold the stock while the pegs are being driven.

33. In a machine of the class described, peg ribbon clamping means comprising a plurality of peg ribbon guides, a clamp member guide lying transverse to and intersecting said ribbon guides, and a single clamp member movably mounted in said last-named guide and arranged to engage and clamp a plurality of peg ribbons.

34. In a machine of the class described, peg ribbon clamping means comprising a plurality of peg ribbon guides and a clamp member movable transversely to said guides into clamping relation to a plurality of ribbons confined in said guides constructed to adapt itself automatically to variations in the sizes of said ribbons.

35. In a machine of the class described, means for clamping a plurality of peg ribbons, comprising a plurality of ribbon guides, a clamp member guide lying transverse to and intersecting said ribbon guides, and a movable clamp member mounted in said last-named guide, said member being so constructed as to adapt itself automatically to a plurality of ribbons of different sizes.

36. In a machine of the class described, peg ribbon clamping means comprising a peg ribbon guide, a clamp member guide lying transverse to and intersecting said ribbon guide, and a movable clamp member closely confined in said guide, said member comprising parts relatively movable into different angular relations to each other whereby the clamping face of said member may adapt itself automatically to variations in the peg ribbon.

37. In a machine of the class described, peg ribbon clamping means comprising a plurality of peg ribbon guides, a clamp member guide lying transverse to and intersecting said peg ribbon guides, and a clamp member movably mounted in said last-named guide, said member comprising a plunger closely confined within said guide and having at its end adjacent to the peg ribbon guides a semi-spherical socket and a ribbon engaging member having a flat ribbon engaging face and a semi-spherical back seated in said socket.

38. In a machine of the class described, a block having peg-ribbon-receiving passages, a gripper for engaging said ribbons, said gripper comprising a stud having a concaved face, and a loose block having a flat toothed face to engage the ribbons, and a convexed face to fit the concaved face of the stud, and means to move the stud in a direction transverse to the peg-ribbon-receiving passage.

39. In a machine of the class described, a peg ribbon gripper presenting a curved back and a seat therefor, combined with a pin entering loosely a hole in said gripper, means to sustain said gripper and means to guide a plurality of peg ribbons into operative relation to said gripper.

40. In a machine of the class described, a slotted plate, a peg ribbon guideway composed of two blocks, one having two grooves to receive the peg ribbons and the other acting to close one side of each of said grooves, a peg ribbon gripper having a tipable acting face, said gripper entering an opening in one of said blocks and adapted to engage both peg ribbons, and means to actuate said peg ribbon gripper.

41. In a pegging machine, a stock support, stock feeding means, a corrugated foot plate convex at its underside in the direction of movement of the stock under it, and means to separate the stock support and foot plate during feeding, the corrugations of said foot plate preventing the slipping of the stock under the foot plate as the latter comes on the end of a tap sole.

42. In a pegging machine, means to drive a peg, a stock support, a corrugated foot plate convex at its underside in the direction of movement of the stock under it, and means to lock said foot plate in position and to effect the clamping of the stock between said stock support and foot plate while a peg is being driven, said corrugations by contact with an inclined part of the sole as at the inner end of a tap sole preventing the slipping of the sole during the operation of clamping the same to receive a peg.

43. In a pegging machine, a work support, a foot-plate provided at its under side with a recess, combined with a feeding device having a lip movable in said recess as the feeding device is operated and the foot plate bears on the stock.

44. In a machine of the class described, a suitable support for the shoe to be pegged, a foot-plate concaved at its underside to bear on the outer face of the sole, and round the same, and means to insert fastenings in succession into the rounded sole.

45. In a machine of the class described, intermittently operating means for compressing and rounding or leveling the sole step by step, and means for inserting fastenings successively in said sole as it is being rounded or leveled.

46. In a machine of the class described, a lever, means to move it, a feeding gripper, and a block or guide having grooves to receive a plurality of peg ribbons carried by said lever, and means to oscillate said block as the gripper carried by said lever acts to feed a plurality of peg ribbons, whereby the peg ribbons may be fed each for the same distance.

47. In a machine of the class described, a lever, a compensating lever carried thereby and grooved for the reception of a plurality of peg ribbons, a foot plate, a lever carrying the same and with reference to which said first named lever is relatively movable, a peg ribbon feeding gripper, a peg ribbon holding gripper, two rods for moving said grippers alternately, a lever to which said rods are attached, said last named lever being pivoted on the lever carrying the foot plate, and means to lock and hold the lever which carries the foot-plate in position to clamp the stock while a peg is being driven into the same.

48. The main lever, a compensating lever pivoted thereon and grooved to receive and direct a plurality of peg ribbons, and a peg gripper, combined with means to turn said compensating lever on said main lever as the latter is actuated to cause the peg ribbons to be fed into the machine uniformly.

49. In a machine of the class described, a vertically movable foot plate, a feeding device, a lifting device inoperative during the operations of the machine, a starting and stopping treadle, and means intermediate it and said lifting device to operate the lifting device to engage and lift the feeding device in unison with the foot plate as the latter is being put into its elevated position of rest with the machine stopped.

50. In a machine of the class described, a lever to control the time of starting and stopping the machine, a treadle under the control of the operator, connections between said treadle and said lever, a feeding device having a lip to ride on the outer face of the stock during the operations of the machine, a lifting device, a connection between said lifting device and said lever to keep said lifting device in its inoperative position during the operations of the machine, means to raise and lower said lifting device, the removal of the foot of the operator from said treadle to stop the machine putting said lifting device into its operative position to lift the feeding device from the stock as the machine comes to rest.

51. In a pegging machine, a ribbon gripping device adapted to grip a plurality of ribbons, a lever carrying said gripping device and moving it in the arc of a circle to feed the ribbon, and a device to govern the position of the ribbon gripping device relatively to said lever so that the ribbons shall be fed for the same or uniform distances.

52. In a machine of the class described, a stock support, a foot plate, an awl bar having an awl, means to move said awl bar diagonally away from and into its operative position, and an abutment located above said foot plate, said awl bar contacting with said abutment as the awl is entering the stock, said abutment overcoming the momentum of the awl bar in its operative stroke and preventing lateral strain of the awl while penetrating the stock.

53. In a machine of the class described, a vertically movable foot plate, and a stock feeding device, a lifting device inoperative during the operations of the machine, and means to actuate said lifting device to lift said feeding device when the machine is stopped.

In testimony whereof, I have signed my name to this specification, in the presence of two subscribing witnesses.

LOUIS A. CASGRAIN.

Witnesses:
GEO. W. GREGORY,
ALEXANDER C. PROUDFIT.